C. F. WICKWIRE.
FLOUR-SIFTER.
No. 186,778. Patented Jan. 30, 1877.
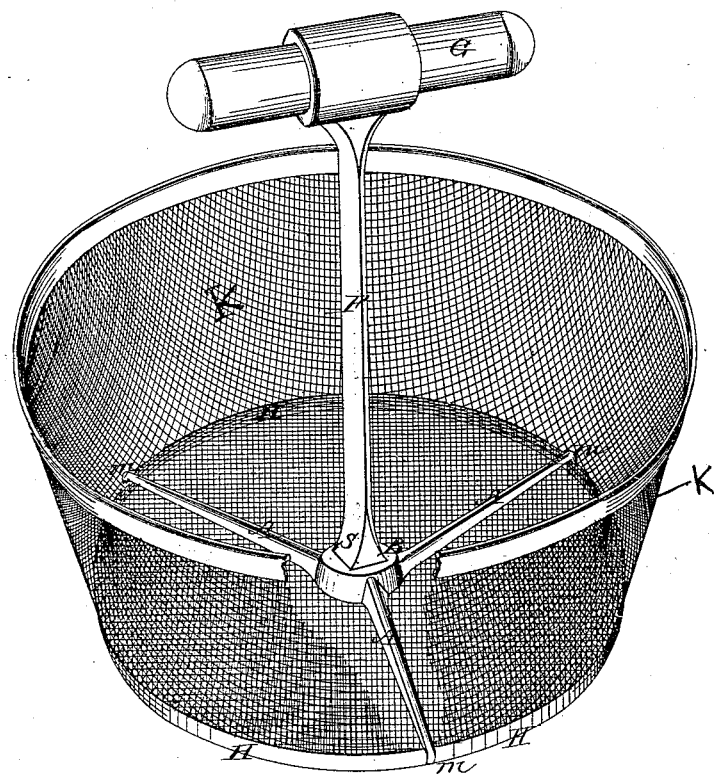
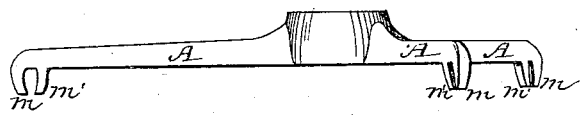
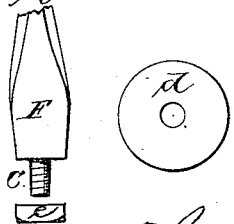
Witnesses
Jane M. Foster
E. P. Halbert
Inventor
Chester F. Wickwire

UNITED STATES PATENT OFFICE.

CHESTER F. WICKWIRE, OF CORTLAND, NEW YORK.

IMPROVEMENT IN FLOUR-SIFTERS.

Specification forming part of Letters Patent No. 186,778, dated January 30, 1877; application filed September 27, 1876.

*To all whom it may concern:*

Be it known that I, CHESTER F. WICKWIRE, of Cortland, county of Cortland, and State of New York, have invented a new and useful Improvement in Flour-Sifters, which is fully set forth in the following specification, reference being had to the accompanying drawings.

The invention relates to that class of flour-sifters usually used in sifting in the barrel or sack by pressing and turning the same down into the flour.

The object of my invention is to stiffen and strengthen the body of the sifter by putting a rim on the bottom of the same, in connection with three arms extending from a hub upon the inside of the sifter, forming a base for a detachable handle.

In the drawings, Figure 1 represents the sifter with the parts in place, except the washer and nut for the handle, which are shown ready to be placed. Fig. 2 shows the base and socket for the handle, with its arms. Fig. 3 shows the position of the handle fitting into the socket, and the washer and nut for the same.

K is the body of the sifter, of wire-cloth, shaped by being pressed over a former, and upon the bottom, on its outer edge, a rim, H, is formed by pressing the wire-cloth into a V shape in the forming process, and then applying V-shaped strips of tin longitudinally, and swaging or crimping them onto the wire rim before formed, thus forming a combined wire and tin rim about or on the bottom of the sifter, thus making it stronger, and forming a support for the handle, as hereinafter described. Upon the inside, and on the bottom of the sifter, is a base or hub, B, of malleable metal, having three or more straight arms or spokes, A A' A'', extending to the rim H. At the outer end of each of these arms are two points or prongs, $m$ $m'$, projecting downward far enough to clasp the rim H. The body of the sifter being flaring, the hub and arms can be pushed down within it, the outer point on each arm passing through the wire at the bottom and down on the outside of the rim, the inner point passing down on the inside of the rim; the points are then pinched together or against the rim, and hold to it securely. In the hub B is a socket, S, into which fits the standard F for the sifter-handle. The lower point of the handle projects through the bottom of the sifter, and receives upon the outside the washer $d$ and nut $c$, which hold not only the standard in place, but also the bottom of the sifter up to the arms A. Upon the upper end of the standard F any desired form of handle may be placed.

I do not claim, broadly, the peculiar construction of the rim H upon the bottom of the sifter, as that was granted me in Patent No. 170,976, December 14, 1875, for manufacturing corn-poppers; but What I do claim is—

1. The body of the sifter, K, provided with the wire-cloth rim H, in combination with the base or hub B and arms A, provided with the points $m$ $m'$, substantially as and for the purpose set forth.

2. The body of the sifter, K, provided with the wire-cloth rim H, in combination with base B, having socket S and arms A, with points $m$ $m'$, and with detachable handle F, substantially as and for the purpose set forth.

CHESTER F. WICKWIRE.

Witnesses:
JANE M. FOSTER,
E. P. HALBERT.